UNITED STATES PATENT OFFICE.

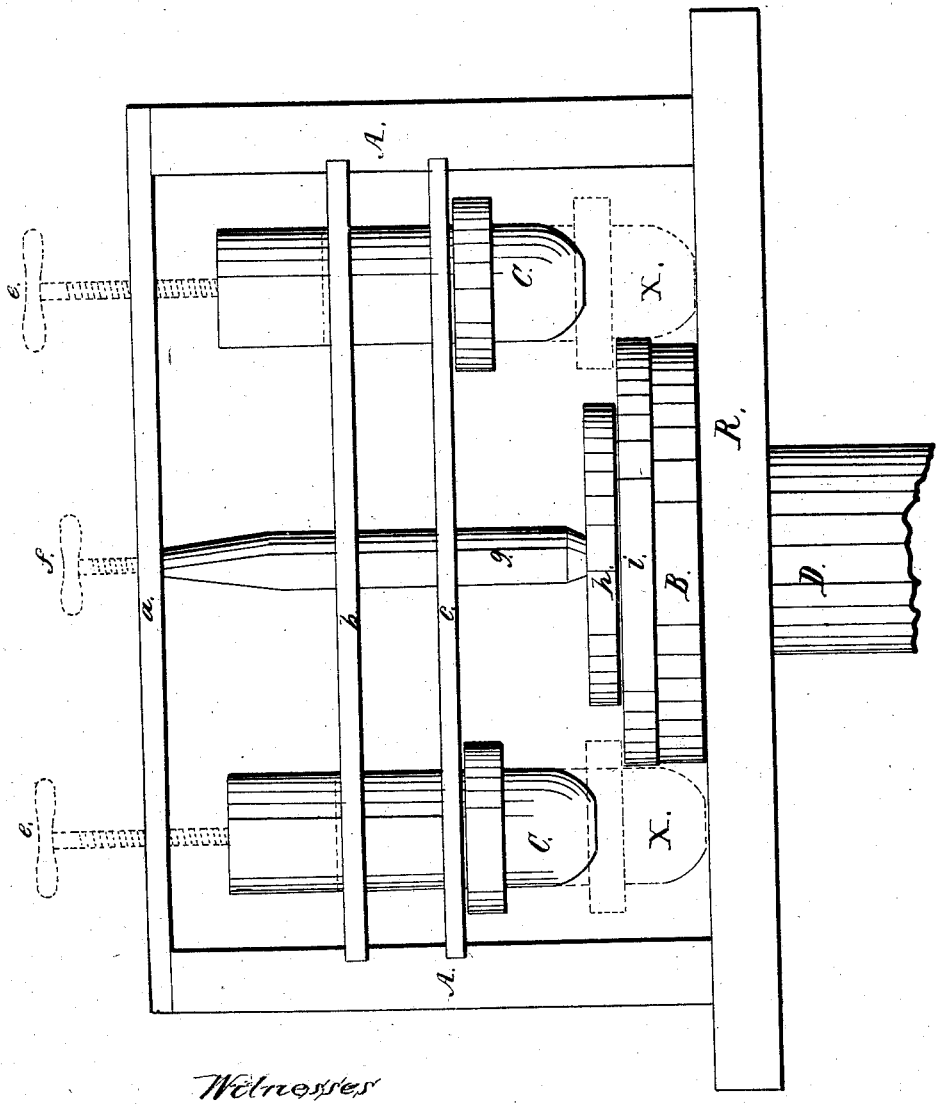

WILLIAM W. MARTIN, OF ALLEGHENY, PENNSYLVANIA.

IMPROVEMENT IN BENDING FLANGES UPON BOILER-HEADS.

Specification forming part of Letters Patent No. 55,687, dated June 19, 1866.

*To all whom it may concern:*

Be it known that I, WILLIAM W. MARTIN, of the city and county of Allegheny, in the State of Pennsylvania, have invented a new and useful Improvement in Machines for Forming Flanges on Boiler-Heads, &c.; and I do hereby declare that the following is a full and exact description thereof, reference being had to the accompanying drawings, and to the letters of reference marked thereon.

The nature of my invention consists in forming flanges on boiler-heads, &c., by the use of a revolving table, in combination with a roll or rolls, said table and roll or rolls being constructed, arranged, combined, and operating in the manner hereinafter described.

To enable others skilled in the art to make and use my invention, I will proceed to describe its construction and operation.

In the accompanying drawing, which represents a front elevation of my improved machine for turning flanges on boiler-heads, &c., A represents the frame or supports for the rolls, table, and other parts. This frame may be made in various forms, and may be made of wood or iron. $a$, $b$, and $c$ represent the cross-bars of the frame, and are used for securing the bearings for the rolls C C, and for clamp $g$, which is used for holding the plate which is to be flanged to its place on the revolving table. The rolls C C should be furnished with adjusting-screws, as indicated by the dotted lines marked $e$, or with some other operating-gear for raising and lowering the rolls to or from their work, and the rolls should be so arranged as to have a lateral motion or movement, so as to adapt the machine to boiler-heads of different size.

The clamp $g$ should be furnished with a screw, as indicated by the dotted lines $f$, for the purpose of bringing the clamp down on the disk $h$, which revolves around with the plate of the boiler-head and the revolving table. This disk $h$, in connection with the clamp $g$, is used for the purpose of holding the plate which is to be flanged to its place on the revolving table, (marked B,) which is placed on the upper end of a shaft, marked D, which has its upper bearing in the cross-piece, marked R. The shaft may be operated by any suitable mechanism desired.

The table B should be so constructed and arranged with relation to the shaft D that it can be removed with ease to give place to a larger or smaller one, or so arranged that it could be increased or be diminished in size for the purpose of flanging large or small boiler-heads—that is to say, boiler-heads of varied size.

As the form and arrangement of the various parts and their relation the one to the other is clearly shown in the accompanying drawing and will readily be understood by the skillful mechanic, I will now proceed to describe the operation of my improved machine for flanging boiler-heads, &c., which is as follows:

I place the plate which is to be flanged on the table B. A portion of this plate will extend out past the outer edge of the table. I then place the disk $h$ central to the plate $i$, which forms the boiler-head. I then secure the disk $h$ to its place by the clamp $g$. I then impart motion to the shaft D, which will impart motion to the table B and to the plate $i$. I then bring the rolls C C, by means of screws $e$ $e$, down on the part of the plate which extends over the edge of the table B, and the revolving of the plate $i$ and table B will revolve the rolls C C, which, by being forced down by the screws $e$ $e$ until they assume the position represented by the dotted lines marked $x$, will force down the part of plate $i$, and form the flange on the boiler-head.

Having thus described the nature, construction, and operation of my improvement, what I claim as of my invention is—

The construction and arrangement of the revolving table B and rolls C, said table and rolls operating substantially as herein described, and for the purpose set forth.

W. W. MARTIN.

Witnesses:
JAMES J. JOHNSTON,
ALEXANDER HAYS.